J. A. JOHNSTON & C. D. JACOBS.
MOTOR VEHICLE JACK.
APPLICATION FILED OCT. 23, 1914.
1,151,106.
Patented Aug. 24, 1915.
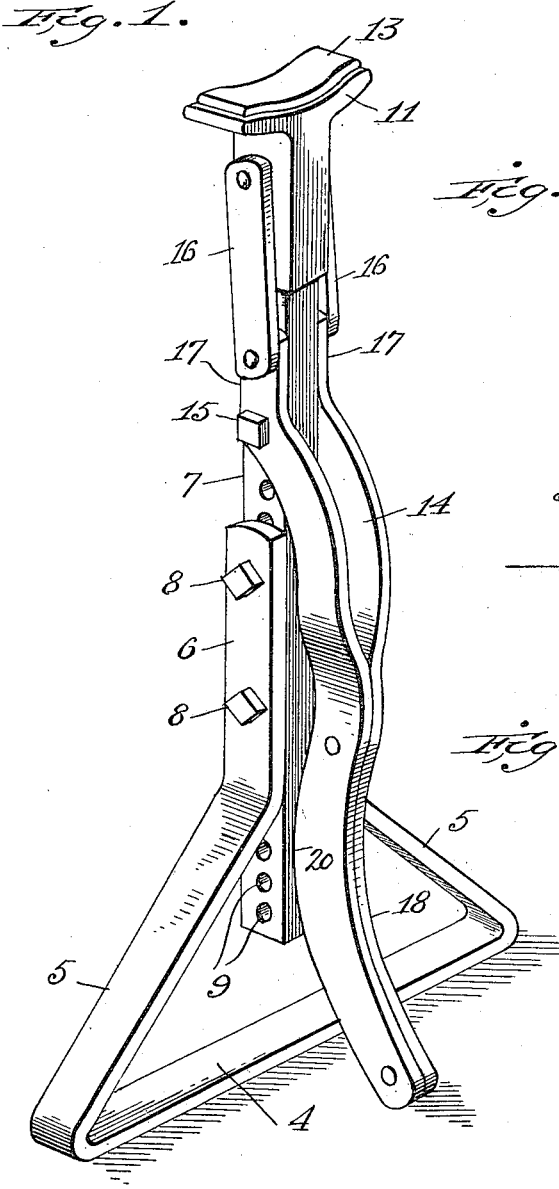
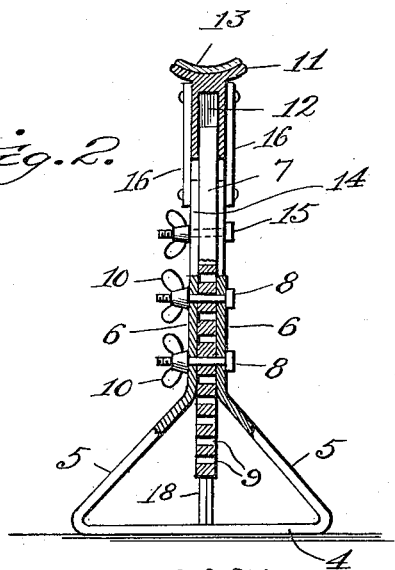
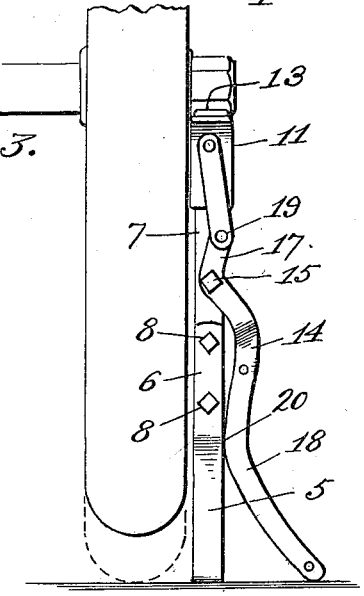
Witnesses
Lillie E. Hercus
Edwin L. Jewell
Inventors
John A. Johnston
Charles D. Jacobs
By Davis & Davis
Attorneys

UNITED STATES PATENT OFFICE.

JOHN A. JOHNSTON AND CHARLES D. JACOBS, OF BLUFFTON, INDIANA.

MOTOR-VEHICLE JACK.

1,151,106.  Specification of Letters Patent.  Patented Aug. 24, 1915.

Application filed October 23, 1914. Serial No. 868,191.

*To all whom it may concern:*

Be it known that we, JOHN A. JOHNSTON and CHARLES D. JACOBS, citizens of the United States of America, and residents of Bluffton, county of Wells, State of Indiana, have invented certain new and useful Improvements in Motor-Vehicle Jacks, of which the following is a full and clear specification.

This invention relates to that class of lifting jacks which are especially adapted for use with automobiles, and has for its particular object to provide a jack which can be closely positioned to the outer face of an automobile wheel whereby its head can engage the portion of the hub which projects beyond said outer face of the wheel.

The particular use for these jacks is for supporting all four wheels of an automobile above the ground while the automobile is in storage for any length of time, to save the tires, one of these jacks being used under each hub, therefore another particular object, is to provide a simple device which can be purchased for a small sum, so as not to make the cost of at least four of them an expensive item for the automobile owner.

A further object of the invention, is to provide a jack wherein the operating handle forms a brace for the jack to prevent its tipping over in one direction and supporting it in an upright position especially when it is under a load.

These and other objects are accomplished by the means illustrated in the accompanying drawing, in which:

Figure 1 is a perspective view of the improved jack, showing the handle in the supporting position. Fig. 2 is a rear elevation of the jack, showing portions in section, and Fig. 3 is a side elevation thereof showing the same applied to the projecting portion of an automobile wheel.

Similar reference numerals in all of the figures of the drawing designate like parts.

In carrying out our invention, a relatively long and narrow base is provided, the same being preferably constructed with strap-steel and bent to form a horizontal portion 4, inclined portions 5, which incline toward each other from the ends of the horizontal portion 4, and the vertical legs 6 which project upwardly from the upper ends of the inclined portions, and are spaced apart to receive therebetween the standard 7, which is preferably constructed from bar-steel and is rectangular in cross section. This standard 7 is supported in position between the legs 6 of the base by bolts 8, which pass through apertures 9 in the standard and the bolts are retained in position by the winged-nuts 10. A series of apertures 9 are provided in the standard, so that the position thereof can be changed as desired to suit the height of different loads.

Upon the upper end of the standard is a supporting and lifting head 11, preferably constructed of malleable iron and which is provided with a socket 12 to receive the end of the standard, and this socket is made to snugly fit the standard to prevent wabbling thereon but at the same time loose enough to allow the head to be reciprocated up and down. The head 11 is projected at each side of the standard, substantially parallel with and in alinement with the long base, thus providing a wide support or seat for the body to be supported. A pad or cushion 13 of leather or its equivalent is secured on the upper face of the head seat in any suitable manner.

The head is operated vertically on the standard with a lever 14, which is pivoted intermediate its length to the standard by a removable bolt 15 and connected to the head by the links 16 on each side of the head, said links being pivoted at both ends to the short ends 17 of said lever and the sides of the head respectively.

Lever 14 is preferably constructed of two pieces of strap-steel, which are united in close relation at their lower ends to form a handle 18 and separated at their upper ends to form a yoke to engage the links 16 on each side of the head. Said lever is also bent outwardly at its lower end and is long enough to form a prop for the body of the jack to support it in a vertical position. This is an important feature of the invention, in that, it enables the base to be made of narrow strap-steel and avoids the cost of a specially cast base. The short upper end 17 of the lever is also bent slightly outward, so that, when the head is elevated the pivots 19 will be over the center, thereby locking the head in its elevated position, as the weight upon the head will tend to throw the curved portion 20 of the lever against the standard 7, as clearly shown in the drawing.

From the above description, it will be observed that a relatively narrow jack is provided with an operating handle which acts as a support for the same when the handle is in its down position.

As before stated it is especially adapted for supporting the weight of automobiles from off their tires, and as only a small portion of the wheel hubs are projected beyond the outer surface of the wheels, the herein described narrow jacks fit close under the projecting portion of the hub, as clearly shown in Fig. 3 of the drawing, and support the weight in a direct vertical line thereunder. Furthermore, this avoids the necessity of placing the jacks beneath the automobile to engage the axles.

It is understood that this improved jack can be used inside as well as outside of the wheels, and in operating it, by placing the base against or close to the wheels on one side of the automobile and elevating this side, that when the other side is being elevated there will be no side shifting of the machine with a tendency of upsetting the jacks first placed. The shifting is prevented by the base of the wheels contacting with the jack and the projected handles acting as a prop.

By using a standard rectangular in cross-section over which the head reciprocates, the head is positively guided in vertical lines and without any twisting motion. This in connection with the cushion or pad on the head prevents the scratching or destroying of the paint or varnish on the wheel hub.

Having thus fully described the invention, what is claimed is:—

1. A lifting jack, comprising a base formed of strap steel bent to form a long horizontal narrow portion and two vertical arms spaced apart, a standard adjustably supported directly by and between said spaced arm, a reciprocating head mounted on the upper end of said standard, means for reciprocating said head embodying a pivoted lever and links, said lever being pivoted to said standard to operate on an axis parallel to said long narrow base.

2. A lifting jack, comprising a base formed of strap steel bent to form a long horizontal narrow portion and two vertical arms spaced apart, a standard adjustably supported directly by and between said spaced arms, a reciprocating head mounted on the upper end of said standard, means for reciprocating said head embodying a pivoted lever and links, said lever being pivoted to said standard to operate on an axis parallel to said long narrow base, and having an outwardly bent free end which is adapted to engage the supporting surface upon which the base rests to form a prop for the main part of the jack.

In testimony whereof we hereunto affix our signatures in the presence of two witnesses this 19th day of October 1914.

JOHN A. JOHNSTON.
CHARLES D. JACOBS.

Witnesses:
HERMAN ANDREW SCHROEDER,
GEORGE T. ALBRIGHT.

Copies of this patent may be obtained for five cents each, by addressing the "Commissioner of Patents, Washington, D. C."